W. D. KNAPP.
SPRAYING MACHINE.
APPLICATION FILED OCT. 22, 1908.

933,039.

Patented Aug. 31, 1909.

WITNESSES
F. E. Maynard
C. A. Penfield

INVENTOR,
William D. Knapp.
BY Geo. H. Strong.
his ATTORNEY

UNITED STATES PATENT OFFICE.

WILLIAM D. KNAPP, OF SANTA ROSA, CALIFORNIA, ASSIGNOR OF ONE-THIRD TO MAUD KNAPP AND ONE-THIRD TO GIOCHCYO N. BACIGALUPI, BOTH OF SANTA ROSA, CALIFORNIA.

SPRAYING-MACHINE.

933,039.  Specification of Letters Patent.  Patented Aug. 31, 1909.

Application filed October 22, 1908. Serial No. 458,975.

*To all whom it may concern:*

Be it known that I, WILLIAM D. KNAPP, citizen of United States, residing at Santa Rosa, in the county of Sonoma and State of California, have invented new and useful Improvements in Spraying-Machines, of which the following is a specification.

My invention relates to spraying machines, and pertains especially to a machine for spraying vineyards.

The object of the invention is to provide a simple, practical machine for spraying over a large acreage, and whereby the machine, in traversing the space between two rows of vines, may spray one or both rows, and will fit the sprays to the width of the rows and the vines; and which spraying apparatus will have various adjustments for adapting the sprays to the width of the rows and height of the vines.

The invention consists of the parts and the construction and combination of parts as hereinafter more fully described and claimed, having reference to the accompanying drawing, in which—

Figure 1:
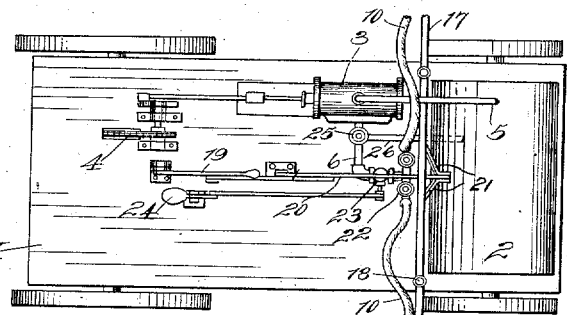
Figure 2:
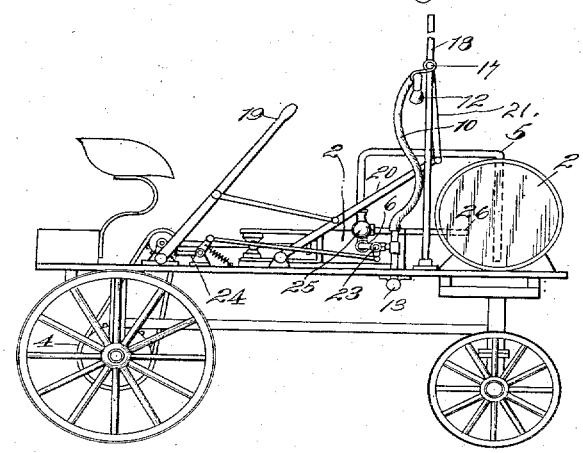
Figure 3:
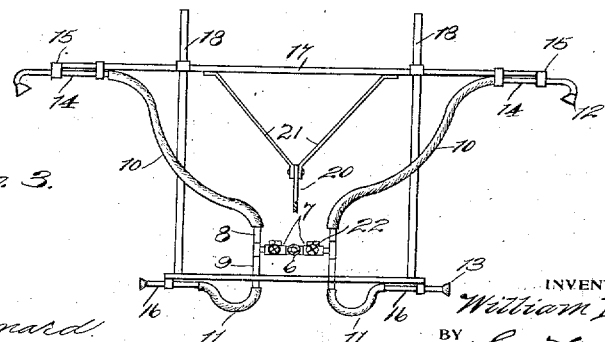

Figure 1 is a plan. Fig. 2 is a side elevation. Fig. 3 is a detail of the nozzle frame.

A represents a wheeled vehicle or traveling support of any suitable size, shape and material. On this is mounted a tank 2 of suitable description and capacity and adapted to contain the spraying solution.

3 is a pump driven by any suitable means. As here shown, this pump is operated from the rear wheels of the vehicle by suitable connections, as represented at 4. The pump draws the solution from the tank through the suction pipe 5 and discharges it through a pipe 6 into lateral branches 7, these branches 7 having other branches 8 and 9 to which are attached suitable flexible connections 10 and 11 leading, respectively, to the top and side spray nozzles 12—13. The nozzles 12 are each carried by a pipe 14, which latter is adjustable crosswise of the vehicle in suitable guide brackets 15; the hose 10 connecting to the pipe 14 and allowing for the adjustment of the pipe 14 to adapt the nozzles 12 to the distance between the rows. Similarly, the side nozzles 13 are carried by adjustable pipe sections 16 and for the same purpose.

The support for the top nozzles 12 comprises a bar or frame 17 which is vertically adjustable on suitable uprights 18. This vertical adjustment of the supporting bar 17 is accomplished by means of an operating lever 19 within convenient reach of the driver, said lever being connected by means of a lever 20 and links 21 with the bar 17 in such fashion that by rocking the lever 19 the sprays 12 may be raised or lowered to adapt the device to vines of different height.

The transverse adjustment of the sprays according to the space between the rows of vines is done before the machine is started, and need not be changed while working in any particular vineyard, since all the rows are spaced substantially the same distance apart.

The lateral branch pipe 7 may be supplied with cocks 22 by which the sprays on only one side of the machine may be operated.

The pipe 6 contains the valve 23 having its stem suitably connected to a foot lever 24 by which the amount of spraying liquid delivered by the pump may be regulated.

Suitable clutch mechanism, not necessary here to be shown, may be employed by which the pump may be readily connected or disconnected with the drive wheels.

An automatic relief valve 25 is adapted to assist in maintaining a given or normal pressure at the discharge nozzles. For instance, if it is desirable to discharge the fluid at, say fifty pounds pressure per square inch, then the valve 25 would be adjusted by means commonly used in connection therewith, so that it would open when that pressure had been passed, thereby diverting a portion of the solution through pipe 26 into the tank 2.

It will also be seen that if the valve 23 is partly or entirely closed while the pump is in operation, or if either of the valves 22 is closed, the valve 25 would again be opened, acting as a safety valve to protect the apparatus against abnormal pressures, or breakage.

Having thus described my invention, what I claim and desire to secure by Letters Patent is—

1. A fluid distributing apparatus comprising a horizontal platform, supporting wheels therefor, a tank disposed transversely on the forward end, and an operator's seat mounted upon the rear end of said platform, a pump, upper and lower discharge nozzles, connections between said pump, nozzles, and tank whereby a fluid is discharged at the nozzles, a transverse, horizontal support located at a higher level than the tank, for the upper nozzles, means providing for the lateral adjustment of the nozzles upon said support, and means comprising a lever located near the operator's seat and connections to the support whereby the nozzles may be adjusted to various elevations above the platform.

2. In a spraying apparatus, the combination of a vehicle, a tank, a pump, spray-nozzles adjustable in bearings secured to the floor of the vehicle, a horizontal, adjustable bar disposed at a higher level than the tank, movable nozzles mounted at the ends of the bar, connections between the pump and the nozzles, vertical guide rods fixed at the sides of the vehicle upon which the bar is slidable, a lever pivoted upon the vehicle body, and a pair of links connecting said lever and bar so that the upper nozzles are moved simultaneously in a vertical plane by operating said lever.

In testimony whereof I have hereunto set my hand in presence of two subscribing witnesses.

WILLIAM D. KNAPP.

Witnesses:
HOPE KNAPP,
HERBERT SLATER.

---

Correction in Letters Patent No. 933,039.

It is hereby certified that in Letters Patent No. 933,039, granted August 31, 1909, upon the application of William D. Knapp, of Santa Rosa, California, for an improvement in "Spraying-Machines," an error appears in the printed specification requiring correction, as follows: Page 1, line 16, the words "the sprays to the width of the rows and" should be stricken out and the words *spray the vines from the side, and on top of* inserted instead; and that the said Letters Patent should be read with this correction therein that the same may conform to the record of the case in the Patent Office.

Signed and sealed this 5th day of October, A. D., 1909.

[SEAL.]
C. C. BILLINGS,
*Acting Commissioner of Patents.* a transverse, horizontal support located at a higher level than the tank, for the upper nozzles, means providing for the lateral adjustment of the nozzles upon said support, and means comprising a lever located near the operator's seat and connections to the support whereby the nozzles may be adjusted to various elevations above the platform.

2. In a spraying apparatus, the combination of a vehicle, a tank, a pump, spray-nozzles adjustable in bearings secured to the floor of the vehicle, a horizontal, adjustable bar disposed at a higher level than the tank, movable nozzles mounted at the ends of the bar, connections between the pump and the nozzles, vertical guide rods fixed at the sides of the vehicle upon which the bar is slidable, a lever pivoted upon the vehicle body, and a pair of links connecting said lever and bar so that the upper nozzles are moved simultaneously in a vertical plane by operating said lever.

In testimony whereof I have hereunto set my hand in presence of two subscribing witnesses.

WILLIAM D. KNAPP.

Witnesses:
 HOPE KNAPP,
 HERBERT SLATER.

---

Correction in Letters Patent No. 933,039.

It is hereby certified that in Letters Patent No. 933,039, granted August 31, 1909, upon the application of William D. Knapp, of Santa Rosa, California, for an improvement in "Spraying-Machines," an error appears in the printed specification requiring correction, as follows: Page 1, line 16, the words "the sprays to the width of the rows and" should be stricken out and the words *spray the vines from the side, and on top of* inserted instead; and that the said Letters Patent should be read with this correction therein that the same may conform to the record of the case in the Patent Office.

Signed and sealed this 5th day of October, A. D., 1909.

[SEAL.]

C. C. BILLINGS,
*Acting Commissioner of Patents.*

It is hereby certified that in Letters Patent No. 933,039, granted August 31, 1909, upon the application of William D. Knapp, of Santa Rosa, California, for an improvement in "Spraying-Machines," an error appears in the printed specification requiring correction, as follows: Page 1, line 16, the words "the sprays to the width of the rows and" should be stricken out and the words *spray the vines from the side, and on top of* inserted instead; and that the said Letters Patent should be read with this correction therein that the same may conform to the record of the case in the Patent Office.

Signed and sealed this 5th day of October, A. D., 1909.

[SEAL.]

C. C. BILLINGS,
*Acting Commissioner of Patents.*